Figure 1:
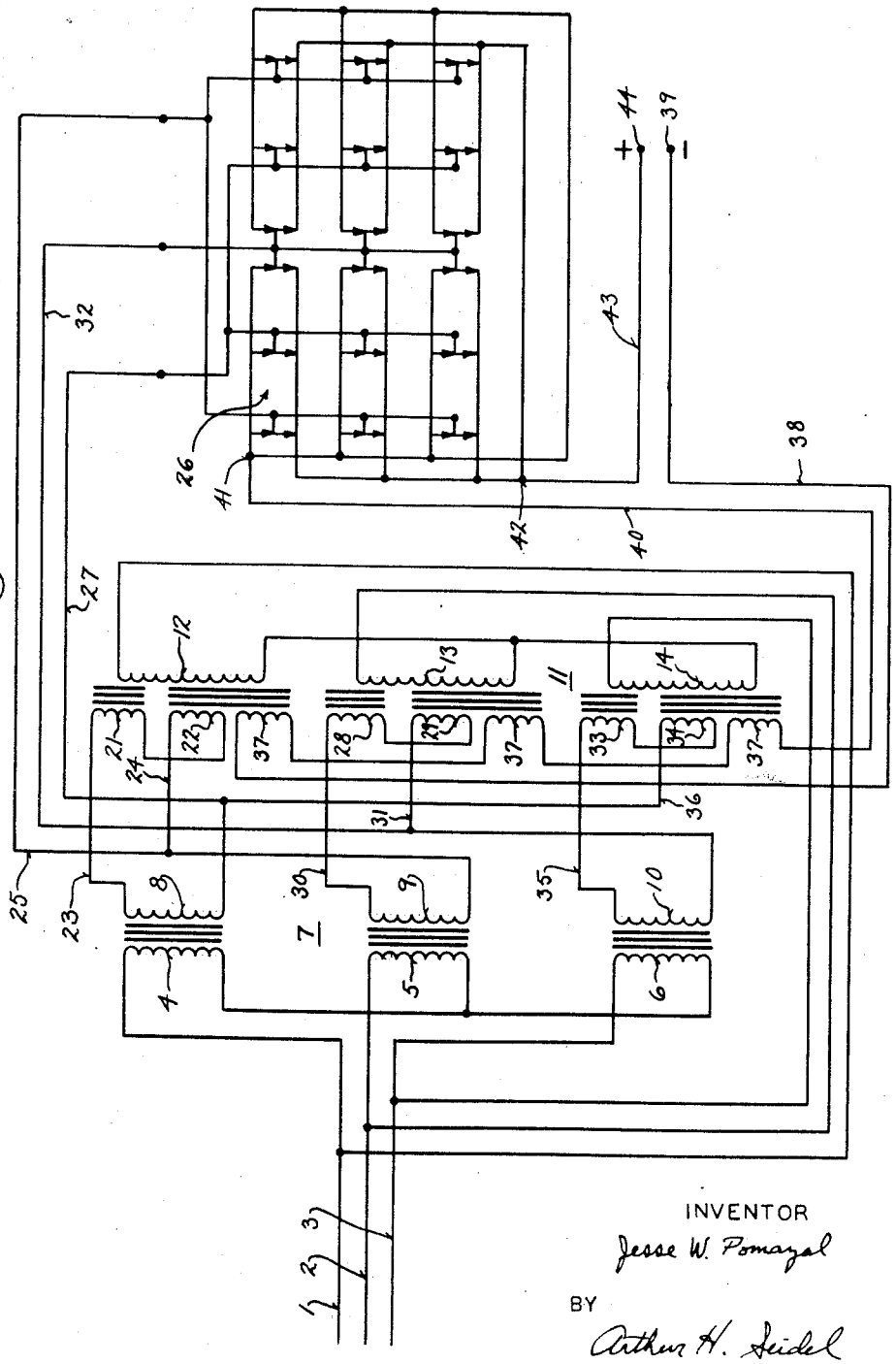

INVENTOR
Jesse W. Pomazal
BY
Arthur H. Seidel
ATTORNEY

United States Patent Office 2,860,299
Patented Nov. 11, 1958

2,860,299

REGULATED POTENTIAL DIRECT CURRENT SOURCE

Jesse W. Pomazal, Escanaba, Mich., assignor to Harnischfeger Corporation, Milwaukee, Wis., a corporation of Wisconsin Application August 4, 1954, Serial No. 447,820

6 Claims. (Cl. 321—16)

This invention relates to direct current potential systems for the static conversion of alternating current and it more specifically resides in a circuit for providing a regulated direct current output that includes a magnetic control transformer having a pair of flux paths that are each linked by a primary winding and that have a first secondary winding linked with one of the flux paths and a second secondary winding linked with the other of the flux paths, which secondary windings are connected with the voltages thereof in opposing relation, and which control transformer further comprises means for magnetizing one of the flux paths to vary the combined output voltage of the pair of secondary windings, and their being an alternating source of working voltage that is joined through the pair of secondary control transformer windings to rectifying means and hence to a set of output terminals.

In the conversion of alternating current to direct current for the operation of some types of welding equipment it is desirable to have a well regulated direct current output voltage over a wide range of load current. Where control reactors and transformers are used in connection with dry type rectifiers the internal voltage drops in each of the respective elements may cause the equipment to display a voltage output curve characterized by a substantial decrease in output voltage as the load current is increased to within the higher ranges of value. In the present invention a voltage cumulative with that applied to the rectifier unit is utilized to offset the internal voltage drops that otherwise present undesirable regulation. The value of the cumulative voltage is varied in proportionate relation to load current with a resulting predetermined regulation of output voltage throughout the full range of load.

It is an object of this invention to provide a direct current power source having an output voltage that is regulated over a full range of load current to present an output voltage value of desired predetermined value for any particular load current.

It is another object of this invention to provide a direct current power source for the conversion of alternating current to direct current wherein a voltage cumulative with respect to that of the secondary of a power transformer is added to the transformer voltage to compensate for internal voltage drops within the apparatus.

It is another object of this invention to provide a direct current power source employing a feed back of load current to automatically regulate the voltage to be rectified by the apparatus.

It is another object of this invention to provide for the parallel operation of a set of direct current power sources that are interconnected to automatically divide load currents between the sources, whereby there is obtained a substantially even distribution of the load.

These and other objects and advantages of this invention will appear in the description to follow. In the description reference is made to the accompanying drawings, which form a part hereof and in which there is shown by way of illustration and not of limitation specific forms in which the invention may be embodied.

Figure 2:
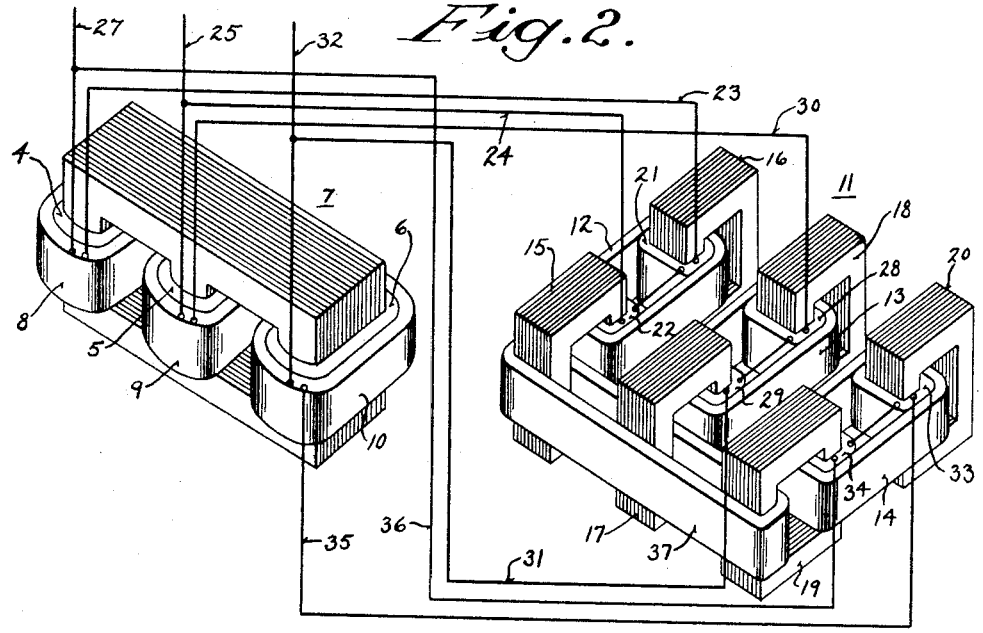
Figure 3:
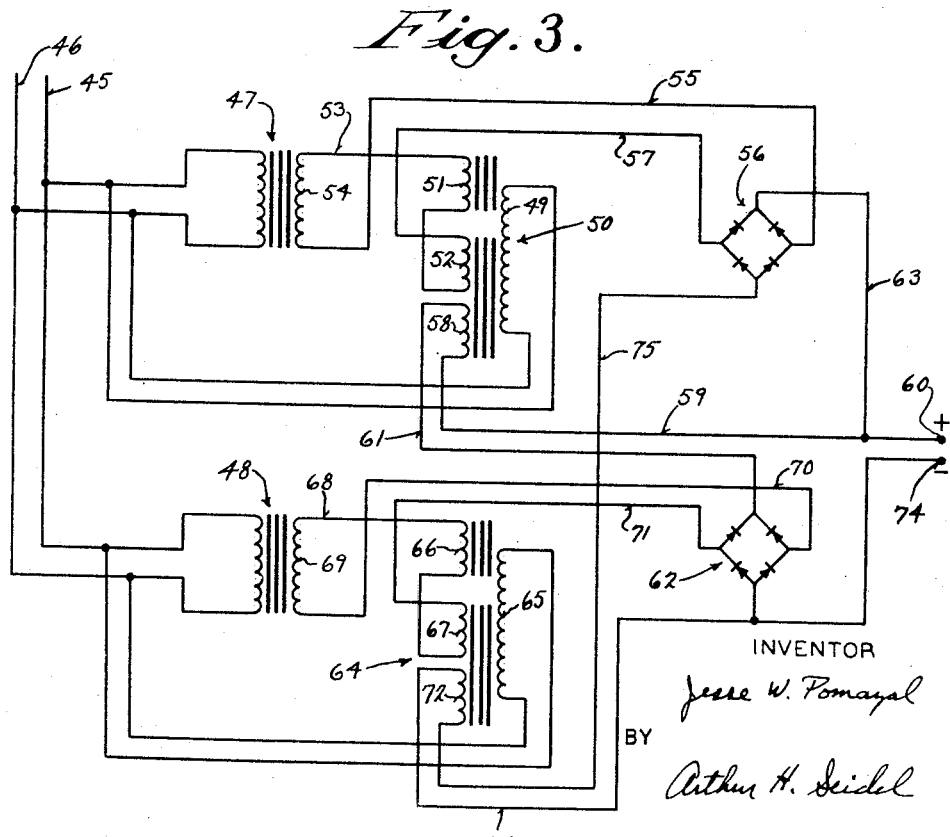

In the drawings:

Fig. 1 is a schematic wiring diagram of a direct current power source for the conversion of alternating current in which the present invention is embodied, Fig. 2 is a view in perspective of the magnetic elements forming a part of the apparatus shown in Fig. 1, and Fig. 3 is a schematic wiring diagram of another form of apparatus in which the invention is embodied, this apparatus including two units for the conversion of alternating current to direct current joined in parallel relation and interconnected to evenly distribute load currents.

Referring now to Fig. 1, a set of three alternating current power lines 1, 2 and 3 are joined to the primary windings, 4, 5 and 6 of a three phase principal power transformer 7. The primary windings 4, 5 and 6 are joined in Y and are magnetically associated respectively with a set of three secondary windings 8, 9 and 10. A three phase control transformer 11 is provided that has a set of three primary windings 12, 13 and 14 connected to one another in Y and also joined to the power lines 1, 2 and 3 to be placed in parallel relation with the primary windings 4, 5 and 6 of the power transformer 7.

As is clearly shown in Fig. 2, the control transformer 11 is of special construction having six separate magnetic cores, two for each phase. The primary winding 12 of the transformer 11 links with legs of two of the cores 15 and 16 to induce a flux in each. Similarly, the primary winding 13 links with legs of a second set of cores 17 and 18, and the third primary winding 14 links with legs of a third pair of cores 19 and 20. Encircling the leg of the core 16, which is linked with the primary winding 12, is a cumulative secondary winding 21 and linked with the leg of the core 15, which is linked with the primary winding 12, is a differential secondary winding 22. One end of the winding 21 is connected to an end of the winding 22 in such fashion that the voltages induced in the secondary windings 21 and 22, by reason of the flux derived from the primary winding 12 will be in opposition to one another.

The end of the cumulative winding 21, opposite that joined to the differential winding 22, is joined through a lead 23 to one end of the secondary winding 8 of the principal power transformer 4 in such fashion that the voltage of the cumulative secondary winding 21 will add to that of the winding 8. The voltage appearing across the secondary differential winding 22 will then be in opposition to the voltage of the secondary winding 8, and the end of the winding 22 opposite that joined to the winding 21 is connected through a lead 24 to a lead 25 which extends to a three phase rectifier 26. The end of the winding 8 which is opposite that joined to the winding 21 is joined to a lead 27 that also extends to the rectifier 26.

A second cumulative secondary winding 28 encircles a leg of the core 18 and a second differential secondary winding 29 encircles a leg of the core 17. The secondary windings 28 and 29 are then connected similarly as the secondary windings 21 and 22 so that the voltages induced therein, by the primary winding 13, will oppose one another. An end of the cumulative secondary winding 28 is then joined through a lead 30 to one end of the secondary winding 9 of the principal power transformer 7, and the opposite end of the winding 9 is connected to the lead 25. The end of the differential winding 29, opposite that end joined to the cumulative winding 28, is joined through a lead 31 to a lead 32 that extends to the rectifier 26.

A third secondary cumulative winding 33 for the control transformer 11 encircles one leg of the core 20 and a third differential secondary winding 34 encircles a leg of the core 19. Secondary windings 33 and 34 will have voltages induced therein by the common primary winding 14, and the windings 33 and 34 are connected to one another so that the voltages induced therein are in opposition. An end of the cumulative winding 33 is joined through a lead 35 to one end of the secondary winding 10 of the principal power transformer 7 in such relation that the voltage of the winding 33 will be cumulative with that of the winding 10. The voltage of the differential winding 34 will therefore be in opposition to the induced voltage of the secondary winding 10. The end of the winding 10 opposite that joined with the cumulative winding 33 is connected to the lead 32, and the end of the differential winding 34 that is opposite the end joined with the winding 33 is connected through a lead 36 to the lead 27.

The foregoing described connections between the secondary windings of the transformers 7 and 11 are shown in Fig. 2, to the exclusion of the primary winding connections, as well as in Fig. 1. The secondary winding connections place the windings of a phase, such as the windings 8, 21 and 22, in series and the three phases are then connected in delta fashion, with the three phase output leads 25, 32 and 27 of the delta arrangement joining the input of the rectifier 26.

As is more clearly shown in Fig. 2, a direct current coil 37 is linked with a leg of each of the magnetic cores 15, 17 and 19 to be coupled with the differential secondary windings 22, 29 and 34 and the primary windings 12, 13 and 14 of the control transformer 11. A lead 38 extends from one end of the coil 37 to a negative output terminal 39 and a second lead 40, that is connected to the opposite end of the coil 37, extends to an output terminal 41 of the rectifier 26. A second output terminal 42 of the rectifier 26 is connected through a lead 43 to a positive terminal 44 suitable, together with the terminal 39, for connection to an equipment to be supplied through the apparatus of the invention.

The rectifier 26 is of the dry disc type and upon drawing current, to supply an equipment joined to the output terminals 39 and 44, it is an inherent characteristic for the rectifier to incur an internal voltage drop. This voltage drop is not entirely linear with the load current, but will increase rapidly for the lighter load values and will then assume a more nearly straight line relationship through the heavier load current range. The principal power transformer 7 will also exhibit an inherent internal voltage drop with increase in load current. Thus, essential elements for static conversion of alternating current to direct current are characterized by a decreasing voltage with increasing load current. Consequently, the regulation of apparatus including these elements is often unsatisfactory due to the undesirable decreasing voltage output with increasing load. Through the introduction of the control transformer 11 means are provided to compensate for inherently poor regulation and through proper proportioning of the transformer 11 the output voltage of the apparatus may be given a predetermined voltage characteristic as desired.

In applications, such as some welding equipment, where it is desirable to retain a nearly constant voltage over the range of load current the apparatus of the invention finds substantial use. For the particular application of supplying a direct current to welding electrodes the control transformer 11 has been constructed to have equal voltages induced in the cumulative secondary windings 21, 28 and 33 and in the respective differential secondary windings 22, 29 and 34, when there is no flow of load current through the winding 37. Since the cumulative and differential windings for each phase are joined in opposition to one another the net output voltage of the control transformer 11 is zero for a no load condition. And, since this net output voltage is in series relation with each secondary winding 8, 9 and 10 of the principal power transformer 7, the phase voltages that will appear at the input of the rectifier 26 will be equivalent to the output phase voltages of the power transformer 7.

As initial load current is drawn from the terminals 39 and 44, the direct current coil 37 will conduct such current to modify the permeability characteristics of the magnetic cores 15, 17 and 19. The load current causes a uni-directional flux to flow in the cores 15, 17 and 19 that magnetizes to introduce saturation effects upon superimposing alternating flux with the unidirectional flux. The reactance presented to the primary windings 12, 13 and 14 by the cores 15, 17 and 19 will decrease, and an increased flux concentration will occur in the cores 16, 18 and 20 where the permeability is the greater. Voltages induced in the cumulative secondary windings 21, 28 and 33 will become greater than that induced in the differential windings 22, 29 and 34. The net output phase voltages of the control transformer 11 will rise and are cumulative with respect to the secondary windings 8, 9 and 10 of the principal power transformer 7. The voltages applied to the input of the rectifier 26 is thus greater than in the absence of the control transformer 11, and similarly the output voltage at the terminals 39 and 44 will be boosted. A compensating voltage rise counteracts the inherent voltage drops that occur in the principal power transformer 4 and rectifier 26 to provide a more stable output voltage with increasing load current. As current output increases, the magnetization of the cores 15, 17, 19 is correspondingly increased to raise the net voltages appearing across the secondaries of the transformer 11, thereby providing a compensation voltage of a value inversely related to the internal voltage drops in the apparatus, that otherwise cause poor regulation. In an application for welding the internal voltage drops of the transformer 7 and rectifier 26 may be nearly matched by the output voltage of the control transformer 11, whereby a well regulated output voltage can be attained at the terminals 39 and 44.

In this manner the stability of the arc for some types of welding is improved. An increased current will not cause a sharp voltage drop, nor will a decrease in load produce a voltage surge, each of which conditions adversely affects certain welding processes. Instead, in the present invention a decrease in load resistance will be accompanied by an increase in welding current, a condition necessary for such welding processes. By proper proportioning of the control transformer 11 the relative voltage outputs of the several secondary windings of the transformer 11 may be selected to achieve an output voltage characteristic for the apparatus that rises with load, or that drops a predetermined amount with load, as well as remaining at a nearly uniform level. Versatility for the adaption of the apparatus to a variety of needs enhances the usefulness of the invention.

Referring now to Fig. 3, there is shown therein a pair of transformer sets and rectifiers connected in a parallel relation and operated from a single phase source represented by the power lines 45 and 46. The primary of a first power transformer 47 is connected across the leads 45 and 46, and likewise the primary of a second power transformer 48 has its primary winding connected to the power lines 45 and 46. A primary winding 49 of a first control transformer 50 is also connected to the power lines 45 and 46, and the transformer 50 includes a cumulative secondary winding 51 and a differential secondary winding 52. The secondary windings 51 and 52 link separate magnetic cores that are in turn each linked with the primary winding 49, similarly as one phase of the control transformer 11 shown in Figs. 1 and 2. The windings 51 and 52 are connected to one another, so that the voltages induced therein oppose one another. One end of the cumulative winding 51 is connected through a lead 53 to one end of a secondary winding 54 of the first power transformer 47 in such fashion that the voltage of the cumulative winding 51 is cumulative with respect to the voltage of the winding 54. The voltage appearing across the differential winding 52 therefore opposes the voltage of the wind 54. That end of the secondary winding 54 opposite to the end joined to the winding 51 is connected through a lead 55 to the input of a rectifier 56, and a second lead 57 joins the side of the differential winding 52, that is opposite the end connected to the cumulative winding 51, to the input terminal of the rectifier 57.

There is provided as a part of the transformer 50 a direct current control coil 58 that is magnetically linked with the differential secondary 52 and the primary 50, similarly as the coil 37 is related to a differential winding 22, 29 or 34 in the apparatus of Figs. 1 and 2. The direct current coil 58 is connected through a lead 59 to a positive output terminal 60 and a lead 61 to the output of a rectifier 62. A lead 63 extends from the output of the rectifier 56 to the output terminal 60.

A second control transformer 64, similar to the transformer 50, has a primary winding 65 connected across the power lines 45, 46. A cumulative secondary winding 66 for the transformer 64 is joined in voltage opposition to a differential secondary winding 67. One end of the cumulative secondary winding 66 is joined through a lead 68 to one end of a secondary winding 69 of the second power transformer 48 and the opposite end of the winding 69 is joined through a lead 70 to the input of the rectifier 62. The side of the differential secondary winding 67, that is opposite the side joined to the winding 66, is joined through a lead 71 to the input of the rectifier 62. A direct current control coil 72 is provided for the control transformer 64, similarly as the direct current control coil 58 is provided for the transformer 50. The direct current coil 72 is connected at one end to a lead 73 that joins with the output of the rectifier 62 and a negative output terminal 74. A lead 75 joins the other end of the winding 72 with the output of the rectifier 56.

With two sets of apparatus, each comprising a rectifier and power and control transformers, having their output arranged in parallel, as in Fig. 3, the load current that may be drawn is increased over that of a single apparatus. It is a characteristic of the usual dry disc rectifier that when units are placed in parallel the unit operating at the higher temperature will tend to carry the greater proportion of the load. The rectifier unit operating at the higher temperature will, then, through this inherent characteristic incur greater temperature increase as the load current rises, and the life of the apparatus may be materially foreshortened. In the apparatus of Fig. 3 the output of the rectifier 56 is connected through the direct current control coil 72 of the second control transformer 64, rather than through the control winding 58 of the first control transformer 50. The output of the rectifier 62 is conducted through the direct current control coil 58 of the first control transformer 50. In the operation of this apparatus if the rectifier 56 is operating at a temperature in excess of that of the rectifier 62 and the load carried thereby tends to disproportionately increase, such increase in load passes through the direct current coil 72 to magnetize the magnetic core associated with the differential secondary winding 67. The control transformer 64 will then increase its net voltage output to apply increased voltage to the rectifier 62. The rectifier 62 then presents a voltage in excess of its former value to cause it to draw a larger proportion of the load current.

The apparatus self regulates to decrease the load current of the rectifier 56 and to retain the temperature thereof within restricted limits. To enhance the self regulation each set of apparatus may be constructed with a dropping voltage characteristic that exhibits a decrease in voltage with increasing current.

For commercial practices in which rectifiers are connected in parallel as in Fig. 3, it is desirable to have the transformer sets comprise three phase systems, such as in Figs. 1 and 2. In this manner the alternating voltages induced in the direct current windings of the control transformers may oppose and cancel one another. The principal of operation of rectifiers in parallel relation, as taught in the single phase illustration of Fig. 3, will be the same for three phase transformer sets.

I claim:

1. In an apparatus for providing a regulated supply of direct current potential the combination comprising a principal transformer with primary and secondary windings; a control transformer including magnetic means for providing a pair of magnetic flux paths, a cumulative secondary winding disposed to link with the first of said flux paths, a differential secondary winding disposed to link with the second of said flux paths, primary winding means linking each of said flux paths, and a direct current winding linking the second of said flux paths; a rectifier; an output circuit for said rectifier connecting the rectifier through said direct current winding to a set of output terminals; and circuit connections for the secondary windings of said principal and control transformers joining said cumulative and differential windings so that voltages induced therein are in opposing relation and connecting the secondary winding of the principal transformer through said cumulative and differential windings to the input of said rectifier.

2. In an apparatus for providing a regulated supply of direct current potential the combination comprising a principal transformer having a primary and secondary windings; a magnetic frame providing a pair of magnetic flux paths; input winding means linking each of said flux paths to induce flux therein; a first induced voltage winding linking the first of said flux paths to have a voltage induced therein by the action of said input winding means; a second induced voltage winding linking the second of said flux paths to have a voltage induced therein by the action of said input winding means; said first and second induced voltage windings being connected to one another in a manner that the voltages induced therein are in opposition; a direct current control winding linked with the first flux path connected to a direct current source for controlling the magnetization characteristics of the first flux path; rectifying means; and connections for said secondary winding of said principal transformer joining said secondary winding through said induced voltage windings to said rectifying means.

3. In an apparatus for providing a regulated supply of direct current potential the combination comprising a magnetic frame providing a pair of flux paths; primary winding means for connection to an alternating voltage source linked with each flux path to induce flux therein; a first secondary winding linked with the first of said flux paths to have a voltage induced therein; a second secondary winding linked with the second of said flux paths to have a voltage induced therein; said first and second secondary windings being connected to place the voltages induced therein in opposition; a control winding linking the first of said flux paths for governing the flux conducting characteristics of the first flux path; rectifying means; a principal working voltage source; and connections joining the principal working voltage source through said secondary windings to said rectifying means.

4. In an apparatus for providing a regulated supply of direct current potential the combination comprising a control transformer including magnetic means for providing a pair of magnetic flux paths, a cumulative secondary winding disposed to link with the first of said flux paths, a differential secondary winding disposed to link with the second fo said flux paths, a primary winding adapted to be connected to an alternating voltage source linking each of said flux paths to induce voltages in said cumulative and differential windings, connections joining one end of said differential winding to an end of said cumulative winding whereby the induced voltages oppose one another, and a direct current winding linking the second of said flux paths; rectifying means including an output circuit joining said rectifying means through said direct current winding to a set of output terminals; a principal working voltage source; and connections joining the principal working voltage source through said differential and cumulative secondary windings to said rectifying means.

5. In an apparatus for providing a regulated supply of direct current potential the combination comprising a transformer having a pair of saturable magnetic flux paths, primary winding means for connection to an alternating voltage source and linking each of said flux paths to induce flux therein, a first secondary winding linking the first of said flux paths to have a voltage induced therein, a second secondary winding linking the second of said flux paths to have a voltage induced therein with one end thereof joined to an end of said first secondary winding whereby the induced voltages oppose one another, and a control winding linking said second flux path for causing a magnetization of the associated flux path whereby the voltage induced in said second secondary winding is altered; rectifying means; circuit connections joining the secondary windings of said transformer to said rectifying means; and connections joining said rectifying means with the control winding to form a supply of direct current for the control winding.

6. In an apparatus for providing a regulated supply of direct current potential a first control transformer including magnetic means for providing a pair of flux paths, primary winding means for inducing flux in said flux paths, a first secondary winding linked with the first of said flux paths, a second secondary winding linked with the second of said flux paths and connected to said first secondary winding to place the voltages induced in the secondary windings in opposition, and a control winding adapted for connection to a current source linked with the second of said flux paths to magnetize said second flux path and vary the permeability characteristics thereof; a first principal working voltage source; a first rectifier; input connections for said first rectifier joining said first principal working voltage source through said secondary windings to the input of said first rectifier; a second control transformer including magnetic means for providing a pair of flux paths, primary winding means for inducing flux in said flux paths, a first secondary winding linked with the first of said flux paths, a secondary winding linked with the second of said flux paths and connected to said first secondary winding of the second control transformer to place the voltages induced in the secondary windings in opposition, and a control winding linked with the second of said flux paths; a second principal working voltage source; a second rectifier; input connections for said second rectifier joining said second principal working voltage source through said secondary windings of said second control transformer to the input of said second rectifier; a set of output terminals; output connections for said first rectifier joining said first rectifier to said control winding of said second control transformer and to said output terminals; and connections for said second rectifier joining the output of said second rectifier to said control winding of said first transformer and to said output terminals.

References Cited in the file of this patent

UNITED STATES PATENTS

| | | |
|---|---|---|
| 2,588,155 | Ofverholm et al. | Mar. 4, 1952 |
| 2,653,293 | Huge | Sept. 22, 1953 |
| 2,679,024 | Oestreicher | May 18, 1954 |